Nov. 25, 1958  A. BONVISSUTO  2,862,110
IGNITION CIRCUIT SWITCH
Filed June 25, 1957
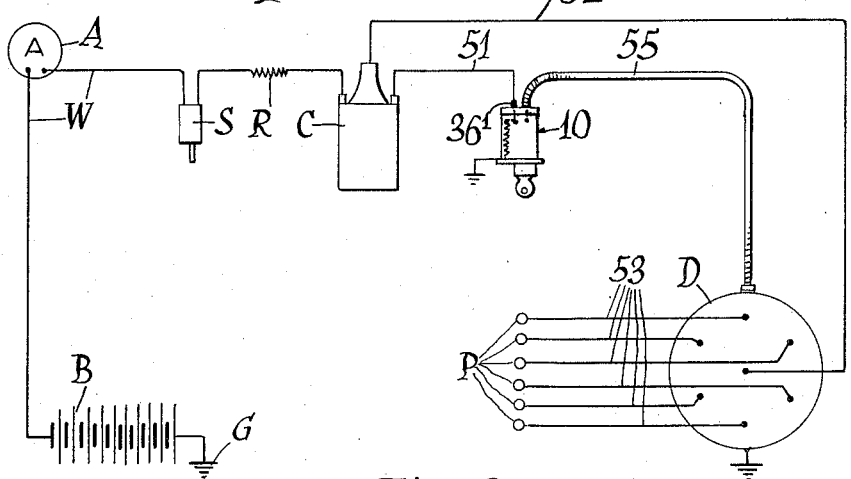
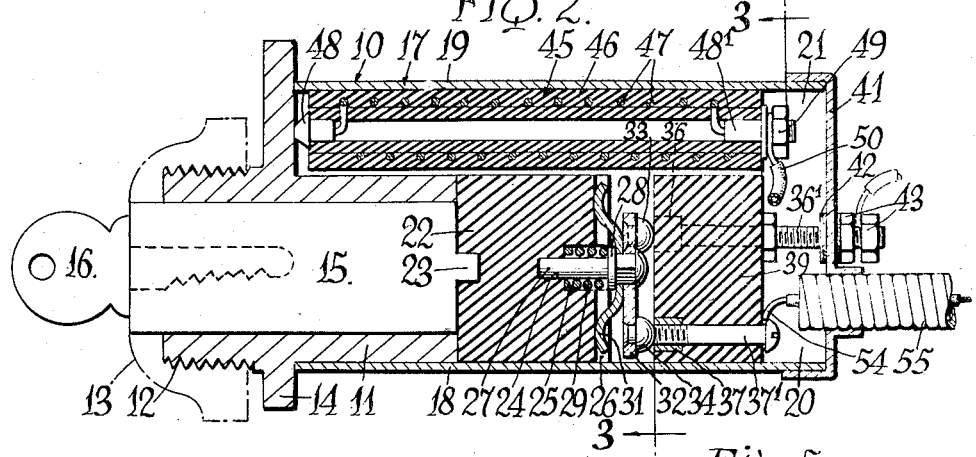
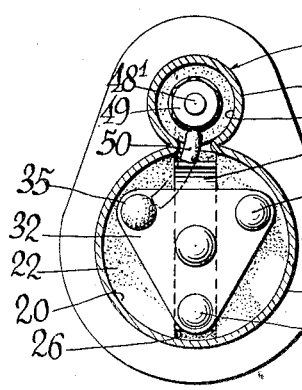
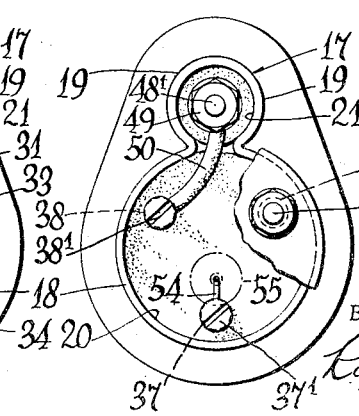
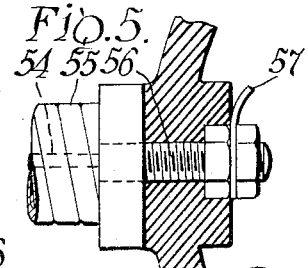
INVENTOR.
Angelo Bonvissuto
BY
Raymon E. Rousseau
ATTORNEY.

United States Patent Office 2,862,110
Patented Nov. 25, 1958

2,862,110

IGNITION CIRCUIT SWITCH

Angelo Bonvissuto, Buffalo, N. Y.

Application June 25, 1957, Serial No. 667,866

2 Claims. (Cl. 307—10)

My invention relates to key operable ignition circuits and more particularly to a key operable switch means operable to make unauthorized use of said circuit difficult and time consuming.

Practically all present day ignition circuits for internal combustion engine operated equipment are provided with a key operable switch which when the key is removed is locked and the circuit is open. However ways and means have been found to quickly by-pass the locked switch to close the circuit and to allow operation and theft of such equipment.

In the case of automotive vehicles for example the ignition circuit includes a storage battery, a spark coil, a distributor and a key lockable switch arranged in the circuit to open it when the switch is locked but the fact that the unauthorized operation and theft of automotive vehicles is increasing each year is evidence that the use of such prior ignition locks is not the answer to the problem of how to prevent or reduce unauthorized use or theft of automotive vehicles.

A considerable number of prior art patents show circuits and lockable switches designed with a view of preventing unauthorized use and theft of automotive vehicles but all of such circuits and switches of which I am aware include a positive grounding feature which I consider objectionable, the reason being that when a positively grounded open circuit is closed by one or more of the methods used by unauthorized users or thieves considerable damage may be caused to the circuit wires, the switch and the vehicle.

The objects of my invention are to overcome the stated objections to prior key lockable ignition circuit controlling switches; to provide a simple, effective and low cost anti-theft key lockable switch formed and arranged in an ignition circuit and usable in combination with or independently of the usual switch to prevent or at least to make closing of the open and locked circuit difficult and time consuming.

In order to better understand my invention it is pointed out that when the ignition circuit of automotive vehicles is open and locked by the usual lockable switch and the switch key is removed such circuits may still be quickly closed and the vehicle operated without using the switch key by any of the following practices:

(1) A penny or other coin, or a strip of conductive foil is fastened across the switch terminals to close the circuit.

(2) A wire is connected to the switch circuit wires to by-pass the switch and close the circuit.

(3) One terminal of the primary winding of a separate spark coil is connected by a wire to a hot lead wire from the battery and the other terminal of the coil is connected by a wire to the distributor in a manner to establish a closed primary circuit, and the terminal of the high tension secondary winding of the coil is connected by a wire to the high tension circuit terminal of the distributor cap, thereby completing an ignition circuit which will allow the vehicle to be operated.

While my key operable ignition circuit controlling switch is usable in an ignition circuit alone it is also usable in combination with the usual switch and it has been especially designed for use in automotive vehicle ignition circuits to prevent unauthorized use and theft of such vehicles by using the above described practices and to make other methods and means used to steal automotive vehicles so difficult and time consuming as to greatly reduce their chances of success.

In the drawing:

Figure 1 is a diagrammatic view of an ignition circuit which includes the switch of the present invention as used in combination with the usual switch.

Figure 2 is a vertical longitudinal sectional view of my improved switch.

Figure 3 is a cross sectional view taken about on the line 3—3 of Figure 2.

Figure 4 is an elevational view of the inner end of the switch with a portion of its end sealing cap broken away.

Figure 5 is a fragmentary view showing how an armored circuit wire is secured to a distributor to prevent its ready removal.

Referring now to the drawing, it will be seen that my improved anti-theft ignition circuit switch generally designated by the numeral 10 has a cylindrical body portion 11, which has its outer end threaded as at 12, to receive a suitable nut 13 (indicated in broken lines). The body 11, inwardly of the threads, is formed with a flange 14 which is shaped as shown in Figures 2 and 3 and which cooperates with the nut in securing the switch to a suitable part of the vehicle.

A cylindrical lock barrel 15 is rotatably secured in the body 11 for rotation between circuit opening and circuit closing positions, as by a key 16. The detailed construction of such lock barrels and keys is well known and need not be described other than to say that the lock is preferably of the type which allows the key to be removed only when the locking barrel is in its locked ignition circuit opening position.

A sheet material casing 17 is formed with alined and parallel larger and smaller cylindrical portions 18 and 19 and the larger portion 18 is fitted upon and rigidly secured to the inner end of the body 11 so that the outer end of the portions 18 and 19 abut against the inner side of the flange 14 to provide a switch mechanism receiving chamber 20 coaxial with and extending inwardly beyond the body 11 and a resistor receiving chamber 21 adjacent and parallel thereto.

A cylindrical plug 22 of insulating material, being rotatably fitted in the larger chamber 18, has its outer end interengaged as at 23 to the barrel 15 for rotative movement thereby and has its inner end formed with a coaxial bore 24, a coaxial counterbore 25 and a diametrically disposed slot 26.

A pin 27 is journaled in the bore 24 and is formed with a concentric flange 28 against which a helical compression spring 29 seated against the inner end of the counterbore 25 bears and acts to resiliently force the pin to the right as viewed in Figure 2.

A bow shaped lever 31, being engaged against the flange 25 and rigidly secured to the free end portion of the pin 27 is engaged in the slot 26 and serves to transmit rotative movement of the plug 22 to the pin, the lever 31 and to a triangularly shaped current conducting contact plate 32 also rigidly secured to the free end of the pin 27. The inner face of the plate 32 is provided with two semi-spherically shaped current conducting contacts 33 and 34 and a third like shaped non-conducting contact 35 for selective engagement of the contacts 33 and 34 with three contacts 36, 37 and 38 carried by a plug 39. The plug 39 is formed of insulating material and rigidly secured in the chamber 18 in spaced relation to the plug 22 and to a cap 41 rigidly secured to and closing the inner end of the casing 17. These contacts being equally spaced and located equidistantly from the concentric axis of the plugs 22 and 39 are resiliently held in engagement by the spring 29 and are selectively engageable by turning the key 16.

The contacts 36, 37 and 38 are rigidly anchored in and may be extended through the plug 39 but are preferably extended by a stud bolt 36' and screws 37' and 38' respectively for the attachment thereto of certain circuit wires to be described. To prevent tampering with the screws 37' and 38' they are located within a space at the inner end of the casing 17 which is closed by a cap 41 rigidly secured to the casing (Figure 2) and to facilitate attachment of a circuit wire to the stud 36' it is extended through a suitable insulator 42 in the cap 41 and has its end portion provided with a pair of nuts 43 (Figure 2).

An important feature of my switch is the provision of the resistor receiving chamber 21 with a resistor 45 having a capacity in the order of 1.580 amperes, 10 ohms and 25 watts. The resistor 45 includes a tubular shell or housing 46 which is fitted in and rigidly secured in place in the chamber 21 and which encases a resistance wire winding 47. The outer end of the winding 47 is secured to a contact 48 which is secured in the bore of the housing 46 and which is engaged with the flange 14. Since the flange 14 is directly connected to the vehicle it is grounded and since the contact 48 is engaged with the flange it is also grounded.

The inner end of the winding is secured to a stud 48' which is rigidly secured in the inner end of the bore of the tubular housing 46 and which also terminates in the space between the cap 41 and the end of the resistor 45 (Figure 2). The inner end of the stud 48' is threaded to receive a nut 49 by means of which one end of a wire 50 is connected to the resistor 45. The other end of the wire 50 is connected to the contact 38 by the screw 38'.

As shown in Figure 1 a wire 51 is connected to the stud 36' and to one terminal of the primary winding of a spark coil C which has its other primary terminal connected in series to a resistor R, a switch S, an ammeter A, a battery B and a ground G by suitable wires W in the usual manner. The secondary or high tension terminal of the coil C is connected by a wire 52 to an automotive distributor D which by means of the wires 53 connects the distributor to the grounded spark plugs P, all in the usual manner. The screw 37' is electrically connected by a wire 54 to a conventional make and break mechanism which is not shown, but which is located within and grounded to the grounded distributor body D when its contact points are closed, thereby completing the primary circuit. The wire 54 is encased in an armor 55 which, to prevent ready access to and tampering with the wire 54, has one end rigidly anchored in the cap 41 and has its other end threadedly connected, as shown in Figure 5, by a threaded connection 56 to a part 57 of the make and break mechanism. When the armour 55 is thus connected, access to the wire 54 is a difficult and time consuming operation and it will be apparent that, when the operating circuit is broken and locked by the switch 10, the methods above described cannot be practiced to overcome my switch.

When my switch is unlocked the switch plate 32 is in a position (Figures 2 and 3) wherein its contacts 33 and 34 engage the contacts 36 and 37 so that, assuming that the switch S is closed, the circuit is closed and operable.

In locking my switch 10 by the key 16 the switch plate 32 is rotated 120° in a clockwise direction, as viewed in Figure 3, and in this locked position the non-conducting contact 35 is engaged with the contact 36, thus opening the primary circuit of the coil C, and the contacts 33 and 34 are engaged with the contacts 37 and 38, whereby if access to the wire 54 should be gained and current is applied thereto part of the current passes to and through the contacts 37 and 33, through the plate 32, to and through the contacts 34 and 38, through the wire 50 and to and through the resistor 45 to ground, so that any current that should reach the distributor will be insufficient to operate it and insufficient to damage the circuit and its elements.

It should be clear now that when my switch 10 is closed and the switch S is open the ignition circuit may be completed either by closing the switch S by its key or by the methods described above, but that when the switch S is closed and my switch 10 is locked and its key 16 is removed the contact plate 32 and the contacts 36 and 37 are positioned to break the primary circuit and to connect the wire 54 to the grounded resistor 45, in the manner described above, so that the ignition circuit cannot be successfully operated except by using the key 16 to unlock the switch 10, or by methods which, because of the time they require to overcome my anti-theft switch, make unauthorized use or theft of a vehicle so equipped and conditioned virtually impossible.

It should be understood that the form of the switch herein shown and described is intended to exemplify the principles of the invention and that various modifications may be made within the scope of the appended claims.

I claim:

1. An anto-theft switch means for the ignition circuit of motor vehicles comprising a current conducting mounting plate securable to a grounded part of the vehicle; a housing having one of its ends rigidly secured to the mounting plate, said housing including a pair of spaced parallel chambers in side-by-side relation and a cap for sealing the opposite end of the housing; a plurality of fixed contacts; a rotatably mounted contact means for engaging selected pairs of the fixed contacts; and a key operable lock means for rotating the contact means between a primary circuit closing position and a primary circuit opening and a resistor circuit closing position, said fixed contacts, contact means and lock means being operably mounted in and encased by one chamber of said housing; and a resistor mounted in and encased by the other chamber of said housing with one end of its resistance element grounded to said plate and its other end connected to one of said contacts; another fixed contact being extended beyond the housing and connected by a wire to the primary winding of a spark coil and the other fixed contact being connected by an armoured wire to a part of a make and break mechanism encased by and groundable during its operation to a grounded distributor, the armour of said wire having one of its ends extended into and rigidly connected to the housing and its other end threadably connected to the distributor to prevent ready access to the wire, whereby when the contact means is positioned to open the primary circuit and close the resistor circuit current applied thereto is shunted through the resistor to ground, thereby preventing operation of the primary circuit and damage to the switch parts, the circuit wires and the vehicle.

2. An anti-theft switch means as set forth in claim 1 wherein the capacity of the resistor is in the order of 1.6 amperes, 10 ohms and 25 watts.

References Cited in the file of this patent

UNITED STATES PATENTS

| | | |
|---|---|---|
| 2,515,044 | Kappel | July 11, 1950 |
| 2,519,758 | Heidman et al. | Aug. 22, 1950 |